Figure 1:
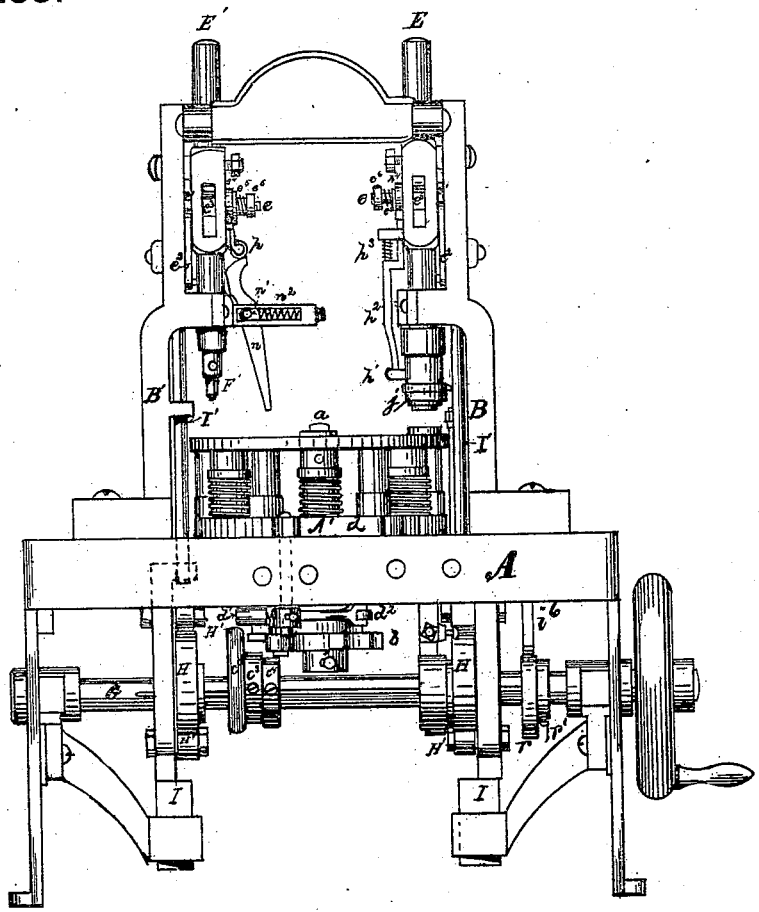

6 Sheets—Sheet 1.

W. W. WADE.
Machine for Making Buttons.

No. 228,233. Patented June 1, 1880.

WITNESSES
T. S. Davis.
W. Clifford Wade.

INVENTOR
William W. Wade

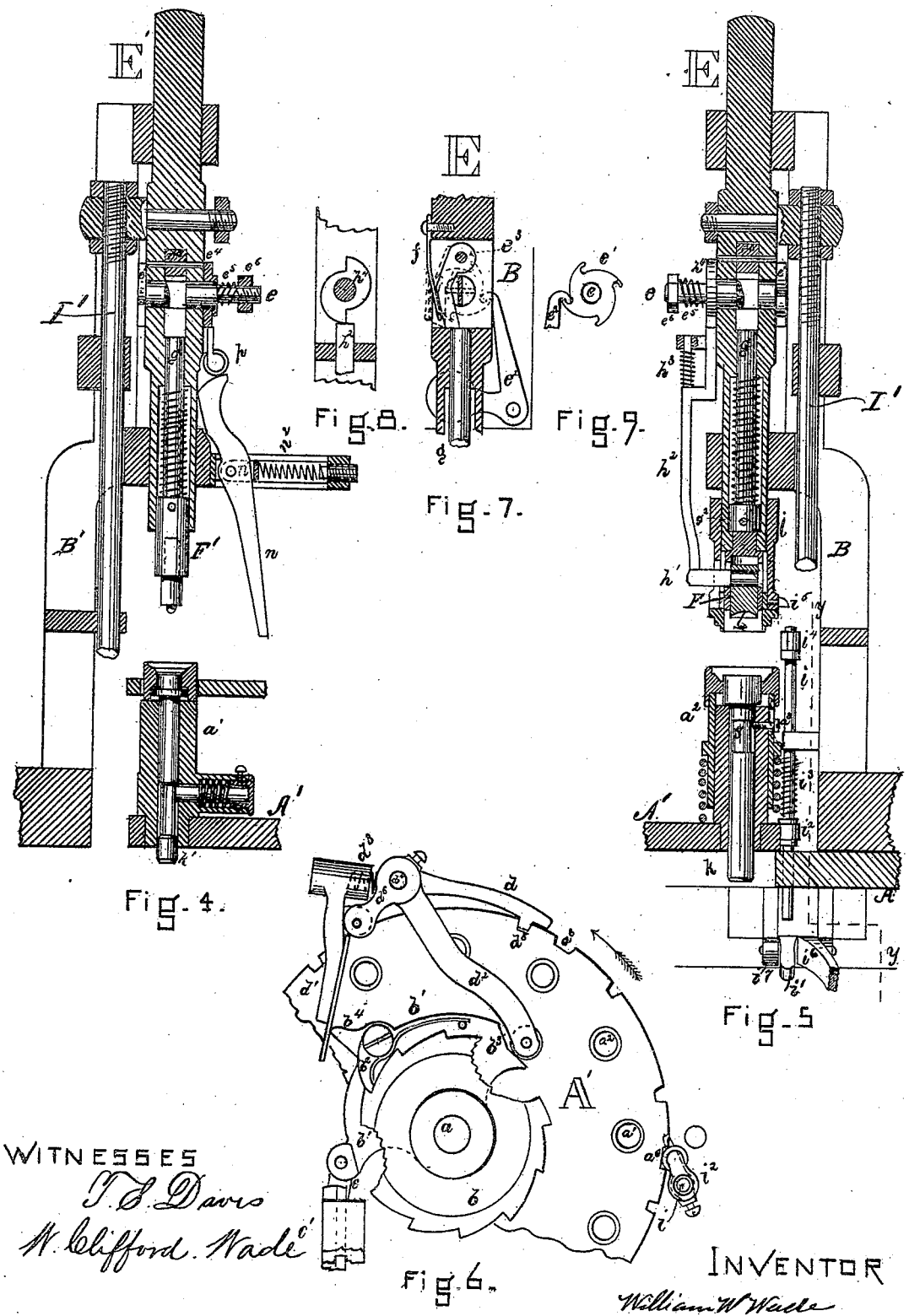

6 Sheets—Sheet 3.
W. W. WADE.
Machine for Making Buttons.
No. 228,233. Patented June 1, 1880.
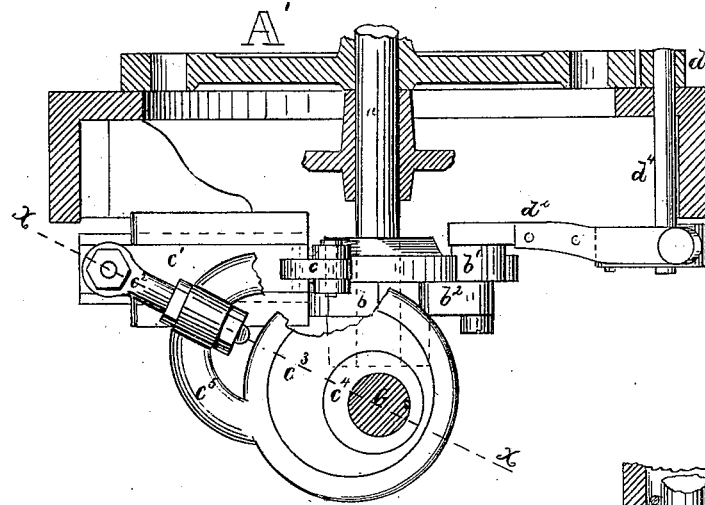
Fig 10.
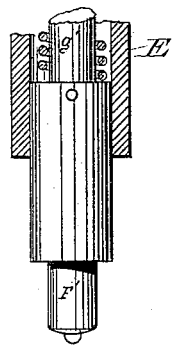
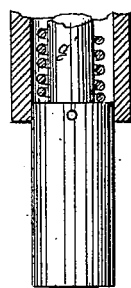
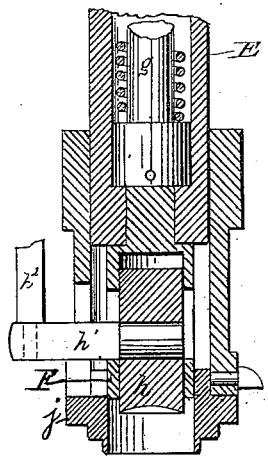
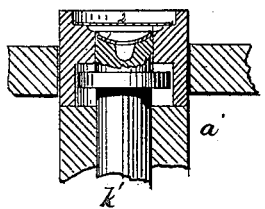
Fig. 11.
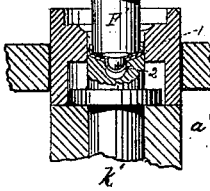
Fig. 12.
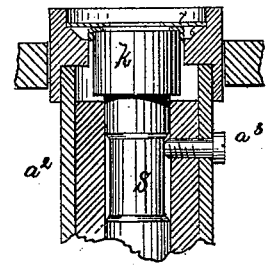
Fig. 13.
WITNESSES
T. S. Davis
W. Clifford Wade
INVENTOR
William W. Wade

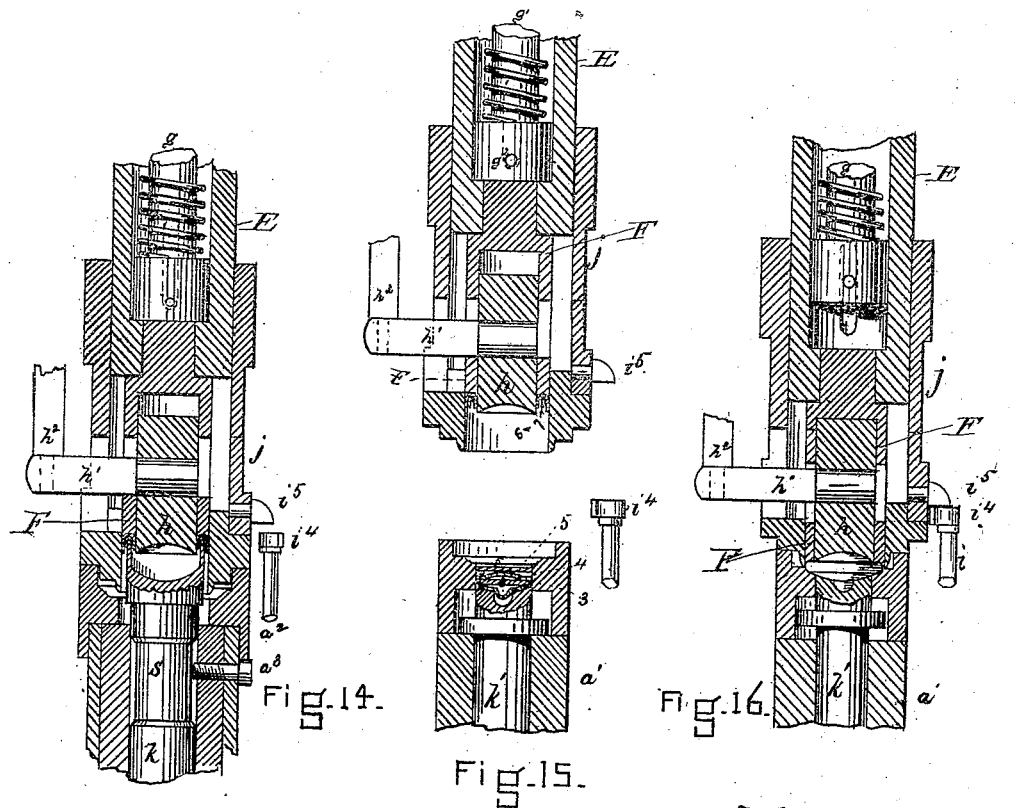
W. W. WADE.
Machine for Making Buttons.
No. 228,233. Patented June 1, 1880.
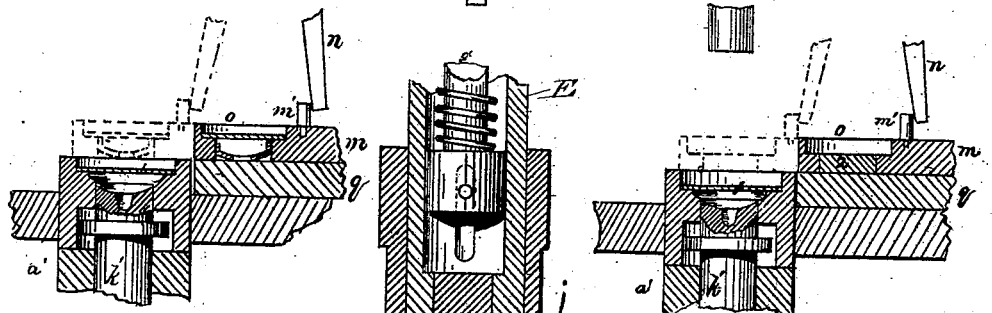
WITNESSES
T. S. Davis
H. Clifford Wade
INVENTOR
William W Wade W. W. WADE.
Machine for Making Buttons.
No. 228,233. Patented June 1, 1880.
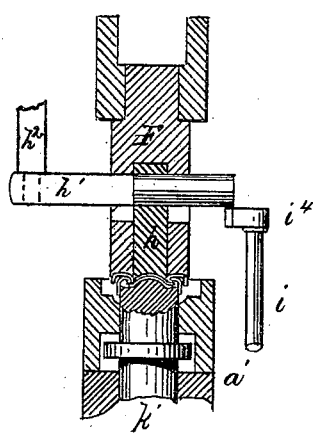
Fig. 20
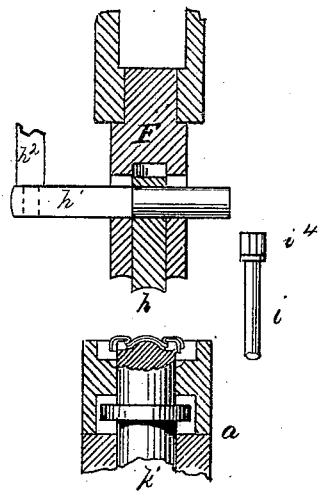
Fig. 21.
Fig. 25.
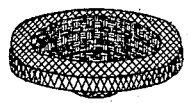
Fig. 22.
Fig. 27.
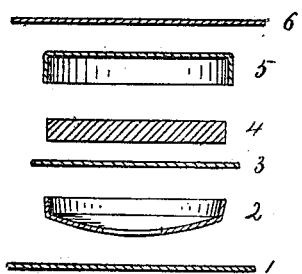
Fig. 26.
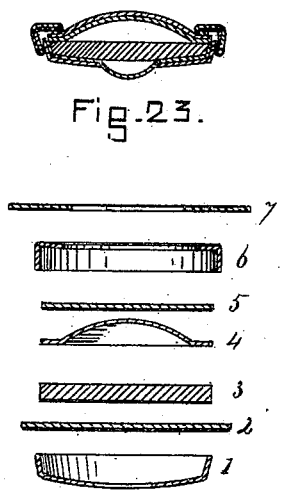
Fig. 23.
Fig. 24.
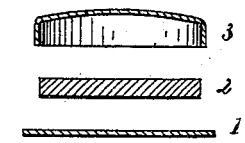
Fig. 28.
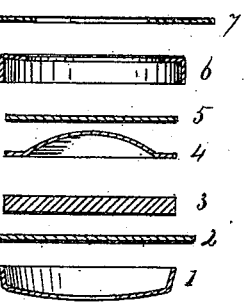
Fig. 29
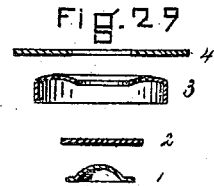
Fig. 30.
WITNESSES
T. S. Davis
H. Clifford Wade
INVENTOR
William W. Wade

UNITED STATES PATENT OFFICE.

WILLIAM W. WADE, OF MEDFORD, MASSACHUSETTS.

MACHINE FOR MAKING BUTTONS.

SPECIFICATION forming part of Letters Patent No. 228,233, dated June 1, 1880.

Application filed July 26, 1879.

*To all whom it may concern:*

Be it known that I, WILLIAM W. WADE, of Medford, in the county of Middlesex and State of Massachusetts, have invented certain new and useful Improvements in Machines for Making Covered Buttons, which improvements are fully described in the following specification.

My present invention consists of certain improvements upon the machine invented by me, and for which Letters Patent were granted to me April 27, 1869, by means of which improvements certain defects are remedied and the machine made more effective and less liable to disarrangement. These improvements embrace alterations in and additions to my machine as patented in 1869, whereby certain new functions are added and the scope of the machine greatly enlarged.

In the machines heretofore in use it has only been possible to manufacture buttons the front or cover of which is of one piece, and which are designated as "plain" buttons, while my improved machine enables me to make buttons the fronts or covers of which may consist of two or more pieces of different patterns or colors, thus adapting the machine to the manufacture of a great variety of styles in what are termed "fancy" buttons.

The general plan and organization of my machine is similar to that of my earlier invention, patented in 1869, embracing (like that) a revolving duplex series of composite or changable bed-dies, one half of which are adapted to make the back parts of the buttons and the other half the front or face parts, and which, by the intermittent rotation of the series, are brought, in succession, to co-operate with two pistons carrying corresponding changeable dies, so that by their joint and interchangeable co-operation, when the separate pieces of which the button is composed are placed upon their appropriate dies, they will be automatically carried forward, formed to shape, put together, secured, and delivered in a finished condition without being released from the control of said dies and without manual intervention till the button is completed.

My improved machine embraces the following devices:

First, an improved device for operating the revolving plate containing the bed-dies, consisting of a double or compound eccentric upon the driving-shaft, whereby greater accuracy of adjustment in the mechanism actuating the movement of this plate is secured, as will be hereinafter described.

Second, improved mechanism for operating the detent, by which the die-plate is more securely held or locked while waiting at rest to meet the co-operating piston-dies.

Third, an oscillating chock for alternately holding and releasing the piston-dies, so as to present either a rigid or a yielding pressure as the bed-die containing the front of the back of the button is pre sented.

Fourth, an automatic mechanism for lifting the covering-die from the bed-die by a separate movement, independent of that given by the rising of the piston, by means of which the sleeve or outer part of the covering-die (which embraces the button, and would naturally take it up in its ascent) is made to release its hold of the button slightly in advance of the upward movement of the piston, thus always leaving the finished button on the lower or bed die, from which it may be readily removed by the hand of the operator.

Fifth, the construction and operation of a series of compound dies in which the separate parts move automatically and independently of each other—as, for instance, the central portion of the compound piston-die may remain stationary while the exterior part of the same has performed a part of its ascent, or the central part of the compound bed-die may be given an upward movement while the exterior part of the same is at rest, by means of which arrangement I am enable to make buttons in which the front or cover is composed of two or more parts as rapidly and accurately as if the cover consisted of a single piece. The process will be hereinafter fully set forth.

Sixth, a device for feeding the parts of the buttons to the dies whenever a guide is necessary to place the parts centrally upon the dies, which consists in providing for each alternate bed-die a sliding plate perforated to receive the part. These sliding plates are placed radially about a common center coincident with the center of the plate holding the dies, and so arranged that, by means of a swinging lever secured to the upright frame and operated by the movement of the piston, the lower end of which lever engages with a pin projecting from the surface of the slide, each slide, when brought to a point abreast of the piston, is moved outward from said center until the opening containing the part is brought beneath the piston-die, and said part is pushed through into the bed-die by the descending piston-die, and the slide is returned to its position for receiving other pieces by the action of a spring.

The description of these devices and their relation to their co-operating parts will be readily understood by reference to the drawings accompanying this specification, in which—

Figure 2:
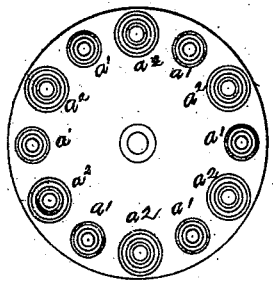
Figure 3:
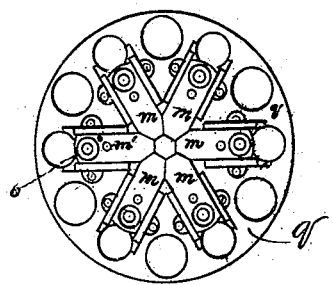
Figure 31:
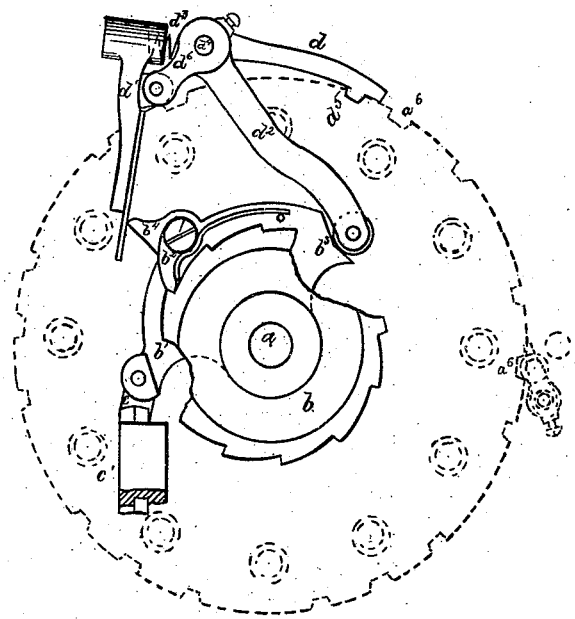
Figure 32:
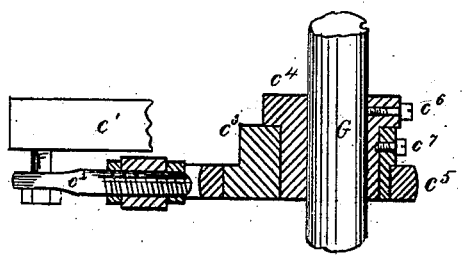
Figure 33:
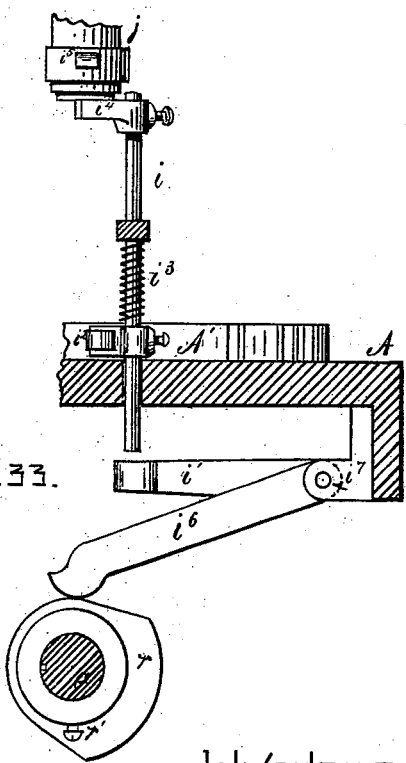

Figure 1 represents a front elevation of the machine complete. Figs. 2 and 3 represent the feeding-plates, Fig. 3 exhibiting my device for feeding the parts automatically. Figs. 4 and 5 are sections showing the movable pistons in their connection with the upright frames, also the manner of securing the dies to the pistons and their relation to the lower or bed dies. Figs. 7, 8, and 9 are cross-sections, showing the mechanism of the alternating motion within the pistons. Fig. 6 is a view of the revolving die-plate, looking upward from beneath it, and shows the ratchet and pawl used to turn the plate and the detent for holding the same. Fig. 10 is a vertical cross-section, showing the complete mechanism for turning the revolving die-plate. Figs. 11, 12, and 13 show the construction and positions of the several dies. Figs. 14, 15, 16, and 17 are also sections, showing the positions of the dies in different stages of their operation. Figs. 18 and 19 are sections showing the parts of the automatic feeding device and their relation to the bed-dies. Figs. 20 and 21 show the positions of the dies in different stages of the process of making the compound cover. Fig. 22 is a perspective view of the finished compound button, Fig. 23 being a section, and Fig. 24 representing the parts of the same in detail. Fig. 25 is a section, and Fig. 26 the parts in detail, of a button composed of six parts, both front and back being covered with cloth. Fig. 27 is a section, and Fig. 28 the parts in detail, of a button composed of only four parts, one of the parts being of metal. Figs. 29 and 30 exhibit the form and parts of the upper half of another style of compound button, two of the parts being of metal. Fig. 31 is an additional view of the parts shown in Fig. 6, showing more clearly the construction of the ratchet and pawl and their connections. Fig. 32 is a cross-section taken on the line marked $x\ x$ in Fig. 10, showing the construction of the compound eccentric and the strap connecting it with the slide. Fig. 33 is a cross-section taken on a dotted line, $y\ y$, in Fig. 5, showing the lifting device and its connections with the cam on the main shaft, the revolving die-plate, and the piston-die.

A is the bed or frame upon which the working parts of the machine are severally arranged, as shown.

A' is a horizontal circular revolving plate, mounted upon the top of a vertical shaft, $a$, and resting upon the bed A. Upon the disk of this revolving plate is arranged a duplex series of bed-dies, alternating, as seen in Fig. 2. (Marked $a'$ and $a^2$.)

Upon the bed A, and overhanging the revolving plate, two upright frames, B B', are secured, which carry respectively the pistons E and E'. These pistons, on opposite sides of the die-plate, carry at their lower ends dies, denominated "piston-dies," and marked F F' in Figs. 4 and 5. These piston-dies co-operate with the bed-dies $a'\ a^2$ in the revolving die-plate as the latter are successively brought beneath the pistons.

G is the main shaft, which receives the power and carries the cams which give motion to the several operative parts of the machine.

The two cams H H, by means of the rollers H' H' on the sliding pieces I I and the rods I' I', leading up to the pistons E E', give to the pistons a vertical reciprocating movement to an extent proper to bring their respective dies to the bed-dies, where they operate upon the materials placed upon the latter in forming the button.

The bed-dies $a'\ a^2$ are placed in the revolving plate A', at equal distances apart, in a circle near the periphery of the plate, as shown. These dies consist of several separate and exchangeable parts adapted to make the styles of buttons required.

In each of the pistons E E' a mortise is cut, as shown, Figs. 4 and 5, and a bore extends from the lower end of the piston to the mortise. Within this bore works a stem, $g$, connecting at its lower end with the movable parts of the piston-dies, as in my patented machine above referred to, its upper end terminating at the lower edge of the mortise.

An arbor, $e$, extends through the piston across this mortise. To one end of the arbor is secured a four-toothed ratchet, $e'$, and the other end is provided with a spiral spring and a nut, by means of which a washer (which is fitted to the arbor with a groove and spline) is pressed against the side of the piston, producing a slight friction, and thus prevents the arbor from being thrown too far in consequence of the rapid motion of the piston, and also from turning back by the drag of the pawl.

The pawl $e^2$ is secured to the frame B, and at each upward movement of the piston engages with one tooth of the ratchet $e'$, so as to give to the arbor $e$ one-fourth of a revolution.

The part of the arbor which is within the mortise is cut away at its sides, giving it the form of a flat bar, as shown in Fig. 7.

It will be observed that at each quarter-turn of the ratchet the flat part of the arbor will assume alternately first a horizontal and then a vertical position.

The piece $e^3$, which I term an "oscillating chock," is pivoted above the arbor, against which it is held by means of the spring $f$, and as the arbor is turned an oscillating motion is imparted to the chock, whereby its lower end is at every alternate movement of the piston brought over the end of the stem $g$ whenever the flat side of the arbor is presented to the chock, (see Fig. 7,) thus holding the movable part of the piston-die in an extended position while co-operating with one of the bed-dies, and allowing it to recede when the next bed-die is presented to the piston-die. The manner in which this oscillating chock operates is indicated by the dotted lines in Fig. 7.

The revolving die-plate $A'$ is secured to the upright shaft $a$, which forms the axis upon which it revolves. To the lower end of this shaft (see Figs. 10, 6, and 31) is attached a ratchet-wheel, $b$, having as many teeth in its periphery as there are dies in the revolving plate $A'$. This ratchet-wheel is worked by the pawl $b^2$, which is attached to the vibrating plate $b'$. The plate $b'$ is of a sectoral form, and embraces the shaft $a$ loosely. At one point of the sector it is connected by the link $c$ to the sliding bar $c'$, (see Figs. 32 and 6.) At another point it has a cam-shaped depression, as shown at $b^3$.

The sliding bar $c'$, by means of the pitman $c^2$ and a strap, $c^5$, Figs. 10 and 32, is connected with the compound eccentric, which latter is composed of, first, the inner eccentric, $c^4$, secured to the shaft $G$, and made adjustable thereon by means of the set-screw $c^6$, Fig. 32, and, second, the outer eccentric, $c^3$, secured upon $c^4$, and made adjustable thereon by the set-screw $c^7$.

By means of the two eccentrics thus arranged the throw can be varied and the movement of the sliding bar can be adjusted with the greatest accuracy. Thus it will be seen that when the shaft $G$ revolves the sliding bar $c'$ will receive a reciprocating motion, and by means of the link $c$, Fig. 6, a vibrating motion is given to the arm or sector $b'$, which carries the pawl $b^2$, which latter engages with the teeth of the ratchet-wheel $b$ and turns the shaft $a$, carrying with it the die-plate $A'$, the ratchet-wheel $b$ being so adjusted as to bring the bed-dies successively and exactly under the piston-dies in the working of the machine.

The device denominated in this specification a "detent" is a provision against any possible accident arising from the die-plate being carried too far by its inertial motion, and to secure more perfect accuracy in the position of the dies when brought together.

An arm, $d$, is secured to a shaft, $d^4$, which arm, at its free end, engages with suitable notches $d^5$ cut into the periphery of the die-plate $A'$. This shaft $d^4$ passes through the bed $A$, and to its lower end is attached an arm, $d^2$, which is bent, as shown, and has at its extremity a roller, which bears upon the cam-shaped surface of the vibrating plate $b'$ at the point of the sector marked $b^3$.

Connecting with an offset on the hub of the lever $d^2$ is a spring-lever, $d'$, so arranged that by means of the spiral spring $d^3$ a pressure is exerted to bring the long end of the lever $d'$ inward or toward the offset $d^6$ of the lever $d^2$. A lug, $b^4$, on the vibrating plate $b'$ engages with this lever $d'$, and as the plate $b'$ moves forward, carrying with it the ratchet-wheel $b$ (by means of the pawl $b^2$ engaging with one of its teeth) and the die-plate $A$ in the direction shown by the arrow, Fig. 6, the lug strikes the spring-lever $d'$, moving it outward and compressing the spiral spring $d^3$ until the roller in the lever $d^2$ reaches the depression at $b^3$, into which it drops, and thus there is imparted a partially-rotating motion to the shaft $d^4$, and the arm $d$ of the detent is swung against the die-plate $A'$ a little before the notch is reached, the spring $d^3$ receiving the motion during the slight interval in which the arm $d$ rests against the die-plate before it drops into the notch, thus preventing injury to the parts, as might occur if they were rigid.

By this arrangement the detent is made to drop instantly into the notch when the latter is reached, and thus the possibility of the die-plate being carried too far by its inertial motion or otherwise is obviated.

It is also apparent that by placing the detent at the periphery of the die-plate the advantage of its greater diameter is secured, and with it the greater accuracy in the operation of the bed-dies.

The construction and operation of the compound dies will be understood by reference to Figs. 4 and 5.

The piston-die $F'$, which, in connection with bed-die $a'$, forms the backs of the buttons, is attached to spindle $g'$ of piston $E'$, which extends through the bore to meet the chock $e^3$, and the die $F$, which, in connection with die $a^2$ and sleeve $j$, forms the front of the button, is attached to piston $E$. Sleeve $j$ is attached to spindle $g$ in the same manner as in my patented machine. A spiral spring surrounds the shank, forcing it down, and its motion is limited by the pin $g^2$, which works in a slot in the lower part of the piston. (Not shown in the drawings.)

In the machine heretofore in use by me I have only employed a movable spindle in the bed-die which formed the back of the button. Now, to enable me to make the different styles of fancy buttons, I provide all the bed-dies with movable spindles. The die $a'$, which is the one used to form the back of the button, is substantially the same as the one heretofore used, and the spindle in the die $a^2$, which is the one which forms the front of the button, is substantially the same as that in $a'$, excepting that it has a neck cut near its upper end, $s$, in Fig. 5, into which is introduced a screw or pin, $a^3$, which, meeting the shoulders of this cut, prevents the spindle from rising out of place at the rising of the piston-die. This form of spindle is used instead of what in my earlier invention was termed a "post," and was secured in the die by a set-screw. The spindles are moved by adjustable levers beneath the bed-dies worked by cams upon the shaft G. (Not here shown.)

The piston-die F has a movable center-piece, $h$, sliding loosely in its socket, and having an arm, $h'$, which extends through suitable slots far enough to support the end of the bar $h^2$. This bar has a bearing at its upper end in a support secured to the piston E, as shown, and a spiral spring, $h^3$, between this support and an angle or offset in the bar exerts a downward pressure upon the latter, thus keeping the center-piece $h$ extended except when it is forced back by engaging with the bed-die or with the lifting device, hereinafter explained. The upper and loose end of the bar named is acted upon by the cam $h^4$ on the arbor $e$, which cam is more fully shown in Fig. 8.

The device which I employ to lift the covering-die from the finished button is shown in Figs. 5 and 33.

The upright rod $i$ has its lower bearing in bed A of the machine, through which it passes. Its upper end is provided with a support which is attached to the upright frame B. This rod $i$ is round, and is allowed to swing slightly from its vertical position and turn loosely in its bearings. Its lower end rests upon the arm $i'$, as shown most distinctly in Fig. 33, which arm is hinged to a lug, $i^7$, attached to the bed A, and is forked or divided. The longer part $i^6$ engages with the cam $r$ on the shaft G. This cam $r$ is adjustable on the shaft by means of the set-screw $r'$, and is so adjusted as to raise the rod $i$ slightly in advance of the upward movement of the piston-die.

The arm $i^2$ is secured to the rod $i$, (see Figs. 6 and 33,) and is provided at its free end with a roller. By means of a spiral spring, $i^3$, this roller is held constantly against the periphery of the die-plate A'. Against each alternate die a notch or depression, $a^6$, is cut in the die-plate, into which, as the plate revolves, the roller in the arm $i^2$ drops, thereby swinging the end of the lifting-arm $i^4$, Fig. 33, under the lug or pin $i^5$ in the covering-die. As the cam $r$ engages with the arm $i^6$ of the lever $i'$ it lifts the rod $i$, and, by means of the arm $i^4$ engaging with the lug $i^5$, raises the die $j$ from the button, at the same time allowing the center-piece $h$, which has no hold upon the button, to be the last to leave it, and thus the button may remain upon the bed-die to be removed by the hand of the operator.

My improved feeding-plate (shown in Fig. 3) is for feeding parts of the button to the dies.

Upon the plate $q$, which surmounts the die-plate, there are six sliding plates, $m$, each arranged to move outward from the center of the die-plate and to bring the opening $o$ centrally between the piston-dies and the bed-dies.

A swinging lever, $n$, is pivoted to a suitable support on the frame B', and, instead of being attached to a rigid support, is pivoted to a block, $n'$, which has a sliding motion within its frame and is held in place by a spring, $n^2$.

The lever $n$ receives a swinging motion by the action of the piston E' and the attached roller $p$, which, acting upon the curved end of the lever $n$, as shown in Fig. 4, moves the lower end toward the piston-die. This lever moves the sliding plates in the required direction.

It will be seen that if the sliding plate $m$ should meet with any obstruction the spring $n^2$ will yield, and, the upper end of the lever also yielding, will allow the roller $p$ to pass without injury occurring to any of the parts of the machinery.

The motion of the lever $n$ is timed with that of the die-plate, so that as the piston E' descends it engages against each alternate die with the pin $m'$, (seen most distintly in Fig. 19,) and moves the sliding plate $m$ outward until the opening $o$ is under the piston-die, and the part of the button which is carried in the opening $o$ is pushed through this opening by the descending piston-die and pressed centrally into its place, uniting it with the other parts of the button, which lie on or in the bed-die beneath it. The sliding plate $m$ is then carried back to receive its new charge by a spring between it and the die-plate. (Not seen in the drawings.)

In the operation of the machine power is applied to revolve the main shaft G at the required speed, and at each revolution the pistons are brought down upon the bed-dies while the latter are at rest. When the pistons rise the revolving die-plate A' is turned one notch of the ratchet-wheel in the direction indicated by the arrow, Fig. 6, by the mechanism already described, and this brings the next dies in the series successively under the pistons. Again, as the pistons rise the ratchets $e'$ engage with the stationary pawls $e^2$ and bring the oscillating chocks $e^3$ alternately opposite to the spindles $g$, which are attached to the movable dies, as shown.

The machine is operated by two attendants, one at each side of it, supplied with the materials used in parts previously shaped for the process of uniting them into a button.

In a button of the kind shown in Fig. 22, a section of which is shown in Fig. 23, there are the several parts indicated in Fig. 24—viz: first, the metallic collet at the back of the button; second, the canvas which, protruding through an opening in the center of the collet, forms the shank or eye—the part by which it is sewed to the garment; third, the paper filling; fourth, a metallic shell sustaining the darkly-shaded portion of Fig. 22; fifth, the cloth for the cover of this darkly-shaded portion; sixth, the metallic rim-shell; and, seventh, the rim-cover of cloth.

One of the attendants places upon the die $a'$, Fig. 11, the metallic collet 1 and canvas 2, and when, by the movement of the die-plate A', this die has come under the piston-die F', and the piston descends, the point of the piston-die forces the canvas 2 through the opening in the collet and forms the shank of the button, as shown in Fig. 12, the piston-die being at this time extended and the chock $e^3$ bearing against the spindle $g'$. At the same time the other attendant places the rim-shell 6 and the rim-cover 7 on the die $a^2$, as shown in Fig. 13, the spindle $k$ being now at its lowest point, the center-piece $h$ of the piston-die held at its most extended point, and the cam $h^4$ having its full side to the upper end of the bar $h^2$.

When the dies come together the spindle $k$ is raised, by the action of the cam and lever upon which it rests, to the position shown in Fig. 14, and the rim shell and cover are forced up into the annular space between the center-piece $h$ and the sleeve or die $j$, and are taken up within the piston-die when the latter rises. (See Fig. 15.)

Simultaneously with the upward movement of the piston E and its die the die-plate A' has turned and brought the bed-die $a'$ underneath it, the latter die having meanwhile received the addition of parts 3, (paper filling,) 4, (metallic shell,) and 5, (center cover.) The spindle $k'$ being at its lowest point, and the center-piece $h$ held down only by the spring $h^3$, when the dies next come together the upper edge of the rim-cover 7 is turned under or into the rim-shell 6, and the center-piece $h$ yielding as it reaches the center shell and cover, (Figs. 15, 4, and 5,) the inner edge of the rim-cover is turned under, and while in this position the spindle $k'$ is raised and all the parts of the button are securely closed together.

It will be observed that at this point the arm $i^2$ of the lifting apparatus is in the position shown in Fig. 6; and also, in Fig. 33, it is seen that the arm $i^4$ is swung under the lug $i^5$, and the lever $i'$ is raised by the action of the cam $r$, and at the same time the sleeve or outer part, $j$, of the die is raised from the bed-die and the button left upon the same, to be removed by the hand of the attendant. The position of the parts at this time is shown in Fig. 17.

The button shown in Figs. 25 and 26 is composed of six parts, the entire back of the button being covered with cloth, and as silk is generally used for this these buttons are called in the trade "silk-backs."

In Fig. 26 are represented the back cover, 1, the collet 2, the canvas 3, the filling 4, the shell 5, and the front cover, 6. It is formed by a process similar to that already described, the dies employed being only slight modifications of those shown in Figs. 14 and 15.

The button shown in Figs. 27 and 28 is composed of only four parts—viz., a canvas back, 1, the paper filling 2, metallic shell 3, and cloth cover 4. It is in the manufacture of this button and that of the silk-back that the feeding-plate shown in Fig. 3 is especially required. As there is no collet used, some device to place the filling in the center of the cloth when the upper and lower dies come in line with each other is necessary. The cloth back 1 is placed upon the bed-die $a'$, as shown in Fig. 18, the paper filling being at the same time placed within the opening $o$ in the sliding plate $m$, Fig. 19. Simultaneously with the die $a'$ being moved under the piston-die the downward motion of the piston E' causes the lever $n$ to swing in the manner already described, and to move the sliding plate $m$ into the position indicated by the dotted lines, when the descending piston-die, passing through the opening $o$, forces the filling into the die $a'$ centrally with the canvas 1, already within that die. At this juncture the co-operating piston-die, bearing the shell 3 and cloth cover 4, which it has in its turn taken up, as elsewhere described, engages with the die $a'$, and the button is closed in the manner already described.

The feeding-plates are also sometimes employed in making buttons in which a metallic collet is used, and the back of the button or of this collet is covered with cloth, in which case the collet and the canvas 1 are both placed within the opening $o$ of the sliding plate, while the cloth back is placed upon the bed-die, as before, and as shown in Fig. 18, when, by a movement similar to that already described, the canvas and collet are carried together into the bed-die centrally with the cloth back-cover.

Figs. 29 and 30 show a section and the detailed parts of the upper or front part of a compound button, which is sometimes made separately, the front and back parts of the same button thus made being united by a subsequent process, the compound cover being considered as one part, and consisting of the center shell, 1, center cover, 2, rim-shell 3, and rim-cover 4. These parts are placed upon the bed-dies in the following order, viz: The rim-shell 3 and rim-cover 4 are placed upon the bed die $a^2$, while the parts 1 and 2 are placed within the bed-die $a'$.

In the descent of the piston-die F upon the bed-die $a^2$ the center-piece $h$ (held down in its most extended position by the bar $h^2$) forces the inner edge of the rim-cover through the opening in the rim-shell, and passes through this opening so far as to take up these parts 3 and 4 with it in its ascent. Simultaneously with this ascent of $h$ the bed-die $a'$, bearing parts 1 and 2, is brought under the same piston-die, and the latter now descends upon $a'$, the spindle $k'$ rises and forces parts 1 and 2 up through the opening of the rim shell and cover, from which opening the center-piece $h$ (having been released from its rigid position) is also forced up and out of said opening, and all these parts, (1, 2, 3, and 4,) now brought together, are securely united and the compound cover is completely formed.

In this process it will be observed that before the parts are clinched together it is necessary that the pressure of the center-piece $h$ should be removed before the dies separate. Otherwise the center shell might be forced back and the parts then separated. I therefore extend the arm $h'$ through the socket of F, bringing its end within the path of the arm $i^4$ of the lifting device, and the center-piece $h$ is thus lifted from the button-cover just as the sleeve $j$ is lifted in the process of making a complete button, already described.

When the parts of the front of this compound button are clinched together, as they are upon the ascent of the spindle in the bed-die, the front is united to the back of the button by the process already described in the making of the plain button.

From the description as now given it will be apparent that by the use of the different improvements herein set forth, with such variations in the changeable dies as are required by the different sizes and shapes of buttons, I am enabled to make both plain and fancy buttons in a great variety of styles in the most perfect manner and at much less cost than by processes heretofore employed.

It will also be apparent that the mechanism employed for lifting the covering-die from the finished button may be varied from that herein described and other means employed to effect the same result without affecting the principle of my invention.

In a machine for making buttons, I claim the following new and improved devices:

1. The combination of the detent or pawl $d$, upright shaft $d^4$, lever $d^2$, flexible lever $d'$, vibrating plate $b'$, provided with projection $b^4$ and depression $b^3$, link $c$, sliding bar $c'$, pitman $c^2$, strap $c^5$, and compound eccentric $c^3 c^4$, substantially as described.

2. In a button-making machine, the combination of the piston E and partible die, carried thereby, with mechanism to separate the parts of said die when required and hold the same asunder, substantially as described.

3. The combination of an upright spindle, $i$, arm $i^2$, spring $i^3$, arm $i^4$, attached to said spindle $i$, die-plate A', provided with notches $a^6$, lever $i'$ $i^6$, cam $r$, piston E, and sleeve $j$, having lug $i^5$, whereby sleeve $j$ is lifted from off the bed-die at the proper time to leave the finished button upon the die, substantially as described.

4. The die-plate A', plate $q$, series of sliding plates $m$, each plate having an opening, $o$, and a pin, $m'$, in combination with lever $n$, roller $p$, and piston E', substantially as described.

5. The plate Q and sliding plates $m$, each having an opening, $o$, and pin $m'$, in combination with piston E', carrying roller or stud $p$, lever $n$, and yielding block $n'$, inclosed in a frame which is rigidly attached to the upright B', substantially as described.

6. The device for alternately holding in a fixed position and releasing the spindle $g$ of the piston-die E, consisting of arbor $e$, formed as described, and ratchet $e'$, in combination with oscillating chock $e^3$, its spring, and pawl $e^2$, substantially as described.

7. A compound piston button-die having a movable center-piece, $h$, in combination with arm $h'$, bar $h^2$, arbor $e$, cam $h^4$, ratchet $e'$, and pawl $e^2$, substantially as described.

WILLIAM W. WADE.

Witnesses:
T. S. DAVIS,
W. CLIFFORD WADE.